United States Patent [19]

Zhang

[11] Patent Number: 5,858,566
[45] Date of Patent: Jan. 12, 1999

[54] SEEDED UNDERLAYER IN MAGNETIC THIN FILMS

[75] Inventor: Bing Zhang, Fremont, Calif.

[73] Assignee: Seagate Technology, Inc., Scotts Valley, Calif.

[21] Appl. No.: 678,424

[22] Filed: Jul. 3, 1996

Related U.S. Application Data

[60] Provisional application No. 60/006,014, Oct. 23, 1995.

[51] Int. Cl.⁶ .................................. G11B 5/64; G11B 5/66
[52] U.S. Cl. ............................ 428/694 TS; 428/694 TP; 428/694 TF; 428/336; 427/128; 427/131; 204/192.2
[58] Field of Search ..................... 428/694 TS, 694 TP, 428/694 TF, 332, 336; 427/128, 129, 130, 131; 204/192.2

[56] References Cited

U.S. PATENT DOCUMENTS

| | | | |
|---|---|---|---|
| 4,631,202 | 12/1986 | Opfer et al. | 428/694 TS X |
| 5,482,785 | 1/1996 | Mahvan et al. | 428/694 TS X |
| 5,494,722 | 2/1996 | Oka et al. | 428/694 TS X |
| 5,576,085 | 11/1996 | Lal et al. | 428/694 TS X |
| 5,631,094 | 5/1997 | Ranjan et al. | 428/694 TS X |
| 5,693,426 | 12/1997 | Lee et al. | 428/694 TS X |
| 5,700,593 | 12/1997 | Okumura et al. | 428/694 TS |

OTHER PUBLICATIONS

CoCrPt Media on HCP Intermediate Layers, Fang et al., Data Storage Systems Center Review Presentations, Nov. 1, 1994.

A Study of Magnetic Recording Media on Glass Substrates, Shalin Duan et al., IEEE Transactions on Magnetics, vol. 30, No. 6, Nov. 1994.

NiAl Underlayers for CoCrTa Magnetic Thin Films, Li–Len Lee et al., IEEE Transactions on Magnetics, vol. 30, No. 6, Nov. 1994.

High Coercivity and Low Noise Media Using Glass Substrate, Xiaoxia Tang et al., IEEE Transactions on Magnetics, vol. 30, No. 6, Nov. 1994.

*Primary Examiner*—Daniel Zirker
*Attorney, Agent, or Firm*—Kinney & Lange, P.A.

[57] ABSTRACT

A seed layer is deposited under an underlayer in magnetic thin film media. The seed layer material has a similar lattice parameter and a similar crystal structure to the underlayer material. The preferred structure involves a nickel-aluminum seed layer, under a chromium underlayer, under a cobalt-based magnetic layer. Use of the nickel-aluminum seed layer produces higher coercivity and lower media noise in the resultant magnetic thin film. The coercivity and media noise values for the resultant magnetic thin film are dependent upon deposition parameters, and recommended deposition parameters are given.

22 Claims, 10 Drawing Sheets

Fig. 11 of # SEEDED UNDERLAYER IN MAGNETIC THIN FILMS

This application claims the benefit of provisional application no. 60/006,014 filed on Oct. 23, 1995, entitled "Low Noise Media By Using NiAl as Seed Layer for CoCrTa Films".

BACKGROUND OF THE INVENTION

The present invention relates generally to magnetic thin films for recording information, and, more particularly, to the use of a seed layer for an underlayer of a magnetic thin film.

Magnetic media are widely used in the computer industry. The media can be locally magnetized by a write transducer, or write head, to record and store information. The write transducer creates a highly concentrated magnetic field which alternates direction based on bits of the information being stored. When the local magnetic field produced by the write transducer is greater than the coercivity of the recording medium, then grains of the recording medium at that location are magnetized. The grains retain their magnetization after the magnetic field produced by the write transducer is removed. The direction of the magnetization matches the direction of the applied magnetic field. The magnetization of the recording medium can subsequently produce an electrical response in a read transducer, allowing the stored information to be read.

The computer industry continually seeks to reduce size of computer components and to increase the speed at which computer components operate. To this end, it is desired to reduce the size required to magnetically record bits of information. It is concomitantly important to maintain the integrity of the information as size is decreased, and disc drives which magnetically store information must be virtually 100% error free. The space necessary to record information in magnetic media is dependent upon the size of transitions between oppositely magnetized areas. It is generally desired to produce magnetic media which will support as small of transition size as possible. However, the output from the small transition size must avoid excessive noise to reliably maintain integrity of the stored information. Media "noise", as used herein, compares the sharpness of a signal on readback against the sharpness of a signal on writing.

In a recording medium with a square hysteresis loop, the width of a recorded transition, a, is predicted to be $$a = (M_r t d / \pi H_c)^{.5}$$

wherein $M_r$ is remanent magnetization;

t is medium thickness;

d is the distance from the write transducer to the medium; and $H_c$ is medium coercivity.

The transition widens with $M_r$ as a result of the fact that the magnetic field existing on one side of a transition affects magnetization on the other side of the transition. The transition narrows as $H_c$ is increased, because with high coercivity, the medium can resist the transition broadening due to the neighboring fields. The magnetic field produced by the write transducer, or head field gradient, is sharpest near the pole tips of the head. The transition widens with d and t, due to the fact that a poorer head field gradient is obtained within the medium when the particles are a further distance from the head. Smaller head-to-medium spacing and thinner medium both lead to narrower transitions being recorded. To decrease transition size, it is desired to produce magnetic media which have higher coercivities, while still providing low noise.

Several material parameters influence the ability of a material to magnetize. Shape anisotropy affects the ease of magnetic recording, as particles are more easily magnetized along the long dimension of the particles. Magneto-elastic anisotropy of a material may affect the ease of magnetic recording. Crystalline anisotropy affects the ease of magnetic recording based on the orientation of crystal structures in the material. In thin films, crystalline anisotropy is the primary means of magnetization. In a disc, grains are more easily magnetized along the plane of the disc because the grains have a preferred crystalline orientation for magnetization lying along the plane. The magnetization results given herein are along the plane of the disc.

Magnetic thin films are a particular type of magnetic medium which are commonly used in computer applications. Thin film media typically consist of a layer or film of a magnetic substance deposited over a substrate. The magnetic substance may be a cobalt based alloy, and the substrate may be a nickel-phosphored aluminum or may be silicon or glass based. A relatively non-magnetic underlayer such as chromium may be used between the magnetic film and the substrate.

To enhance the durability of the disc, a protective layer of a very hard material is applied over the cobalt alloy film. A typical protective layer is an overcoat of sputtered amorphous carbon about 100 to 300 Angstroms thick. The overcoat surface is usually lubricated to further reduce wear of the disc due to contact with the magnetic head assembly. The lubricant is typically applied evenly over the disc in a molecularly thin film having a thickness from 10 to 50 Angstroms. Perfluoropolyethers (PFPEs) are currently the lubricant of choice for thin film recording media.

When applied as a thin film, the crystal structure of the magnetic layer depends firstly on the composition of the magnetic layer, but also depends on the deposition conditions and processes. Cobalt based alloys have been sputtered onto substrates with chromium underlayers to produce media with coercivities in the range of 1800–2900 Oersteds. The coercivities and media noise can be affected significantly by optimizing the deposition processes.

Coercivities and media noise can also be affected significantly by the composition and microstructure of the underlayer. The initial grain growth of the magnetic layer is dependent on the underlying grain structure of the underlayer. Chromium underlayers have often been used to foster a microstructure in a Cobalt-based magnetic layer with high coercivity and low noise. Underlayers of other materials have also been reported, such as NiAl, Mo, W, Ti, NiP, CrV and Cr alloyed with other substitional elements. However, only a few of the underlayers actually perform well, and the most successful underlayer has been pure chromium. It is believed that the BCC crystalline structure of Cr underlayers promote grain-to-grain epitaxial growth of the HCP microstructure of cobalt-based thin films, providing a magnetic layer with small grains with in-plane c-axis texture. The chromium underlayer may be applied in a single deposition, or may be applied in two separate deposition steps, in which the first layer may be referred to as a chromium seed layer for the second layer.

SUMMARY OF THE INVENTION

The present invention involves use of a seed layer for the underlayer film. The seed layer, a metal alloy and preferably nickel-aluminum, is deposited over a substrate. The underlayer film, a different material than the seed layer and preferably chromium, is deposited over the seed layer. A magnetic layer, preferably a cobalt based alloy, is deposited over the underlayer film. It has been found that use of the different material seed layer for the underlayer can produce higher coercivity and lower noise in the resultant magnetic thin film. The nickel-aluminum seed layer/chromium underlayer combination works particularly well, possibly due to the fact that nickel-aluminum and chromium have crystal structures and lattice parameters which differ from each other by only a slight amount.

DETAILED DESCRIPTION OF THE PREFERRED EMBODIMENTS

Figure 1:
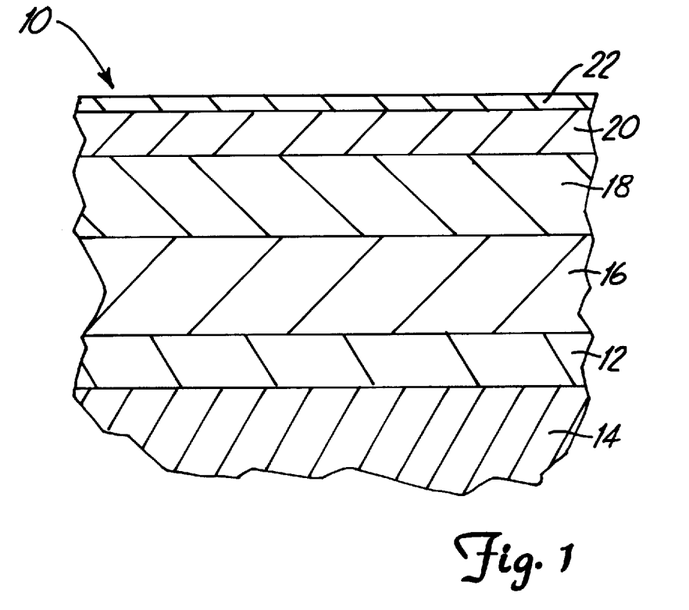
FIG. 1 is a cross-sectional side view of a recording medium incorporating the seeded underlayer of the present invention.

The present invention involves manufacture of a magnetic medium 10 as illustrated in FIG. 1. Magnetic medium 10 has a seed layer 12 for increased coercivity and reduced media noise. Seed layer 12 is deposited over a substrate 14, and underlayer 16 is deposited over seed layer 12. A magnetic thin film layer 18 is deposited over underlayer 16, and an overcoat 20 is deposited over magnetic layer 18. A lubricant layer 22 is applied over overcoat 20. Overcoat 20 and lubricant 22, while not performing a magnetic function, greatly affect the tribology between the magnetic medium 10 and the read-write head, and are very useful in resisting wear of magnetic medium 10 which might otherwise be caused by the read-write head. Overcoat 20 and lubricant 22 also help magnetic medium 10 to resist corrosion.

Substrate 14 is preferably a nickel-phosphorus plated aluminum disc. Substrate 14 provides the structural integrity for magnetic medium 10. Other materials, such as glass, glass-ceramic or manganese-oxide, may also be suitable for substrate 14.

Seed layer 12 is formed of an alloy which is relatively non-magnetic compared to the magnetic thin film 18. Seed layer 12 is preferably a nickel-aluminum alloy, which is cubic and has a B2 ordered crystal structure. The superlattice of nickel-aluminum alloy in bulk samples is stable over a wide composition range from about 41.5 to 55% aluminum. The nickel-aluminum alloy is preferably at a stoichiometric ratio, i.e., a 50% nickel, 50% aluminum alloy. Application of nickel-aluminum alloys of other proportions may be equally beneficial, but sputtering targets tend to be less brittle if prepared at a stoichiometric ratio. Nickel-aluminum forms a highly stable B2 ordered phase because of strong bonding between the nickel and aluminum atoms. The high stability implies low atomic mobility which can yield a smaller grain size. Nickel-aluminum is paramagnetic with a very low susceptibility and has good thermal conductivity, high stiffness and good environmental corrosion resistance.

Seed layer 12 should be fairly thin, such as a layer of about 150 to 450 Angstroms. Seed layer 12 may be applied over substrate 14 by sputtering, and various sputter chamber parameters may contribute to the effectiveness of seed layer 12. The preferred sputtering process includes cleaning the substrate 14 and heating the substrate 14 with a 3.2 kilowatt heater prior to deposition of seed layer 12. Seed layer 12 may be applied by sputtering at a power of 0.9 kilowatts, a bias of 0 volts, and a gas flow of 12 standard cubic centimeters per minute, which creates a seed layer 12 which is about 270 Angstroms thick.

Underlayer 16 is a relatively non-magnetic metal. The two materials selected for the underlayer 16 and the seed layer 12 preferably have slightly different lattice parameters provided by different crystal structures. Underlayer 16 is preferably substantially pure chromium, which has a body-centered cubic or BCC crystal structure. The B2 structure of nickel-aluminum is an ordered structural derivative of the BCC structure of chromium. The nickel-aluminum alloy used in the preferred seed layer has a reported lattice parameter of a=2.887 Angstroms, while the chromium used in the preferred underlayer has a reported lattice parameter of a=2.884 Angstroms. Because of the crystallographic similarities and differences between these materials, nickel-aluminum and chromium make effective companion materials for seed layer 12 and underlayer 16. Workers skilled in the art will appreciate that underlayers 16 of materials other than chromium may show beneficial results if seeded with a seed layer 12 of an appropriately chosen companion material.

Underlayer 16 should be nearly as thick as or thicker than seed layer 12. For instance, an underlayer 16 in the range of about 300 to 650 Angstroms, or about 1.5 to 2.5 times as thick as seed layer 12, provides very good results. Underlayer 16 may be applied over seed layer 12 by sputtering, and various sputter chamber parameters may contribute to the effectiveness of underlayer 16. The preferred sputtering process involves a power of 2.0 kilowatts, a bias of −250 volts, and a gas flow of 25 standard cubic centimeters per minute, which creates an underlayer 16 which is about 500 Angstroms thick.

Magnetic layer 18 of a magnetic material is applied over underlayer 16. Magnetic layer 18 is preferably formed of a cobalt-based alloy, such as a cobalt-chromium-tantalum alloy. In the CoCrTa alloy, the proportion of Co as an atomic molar ratio should be 70% or greater, and preferably 75 to 86%. The proportion of Cr in the CoCrTa alloy should be between 0 and 25%, and preferably 8 to 16%. The proportion of Ta in the CoCrTa alloy should be 0 to 10%. One preferred magnetic thin film 18 is a 84% Co, 10% Cr, 6% Ta alloy. Many other cobalt-based alloys, such as a CoCrPtTa alloy for instance, may be equivalently used for magnetic layer 10. The cobalt-based magnetic layer 18 has a hexagonal close-packed or HCP crystal structure.

Magnetic layer 18 is preferably 200 to 300 Angstroms thick. Magnetic layer 18 may be applied over underlayer 16 by sputtering, and various sputter chamber parameters may contribute to the effectiveness of magnetic layer 18. The preferred sputtering process involves a power of 0.98 kilowatts, a bias of −250 volts, and a gas flow of 30 standard cubic centimeters per minute.

Overcoat 20 enhances the durability and wear resistance of the magnetic medium 10. Overcoat 20 preferably is a layer of sputtered amorphous carbon about 150 Angstroms thick. Other materials which may be suitable for overcoats include sputtered ceramic zirconium oxide and amorphous films of silicon dioxide. Any of the substrate 14, the underlayer 16 or the overcoat 20 may be textured as desired for beneficially affecting the tribology of the particular disc drive system.

A lubricant layer 22 overlies overcoat 20. Lubricant layer 22 further reduces wear of the magnetic medium 10 due to contact with the magnetic read-write head assembly. The lubricant 22 is preferably a PFPE-based lubricant having a thickness of 10 to 50 Angstroms.

Both coercivity and media noise in the resultant magnetic medium 10 depend on a number of deposition parameters. The heater power or sputter temperature, the NiAl bias, the NiAl gas flow or sputter pressure, the NiAl sputter power or thickness, the Cr sputter power or thickness, and the CoCrTa gas flow or sputter pressure all contribute to the coercivity and media noise in the resultant magnetic medium 10.

Magnetic medium 10 provides significant improvement in magnetic performance, both in increasing coercivity and in decreasing media noise. The improved magnetic performance is believed to be primarily due to the initial growth mode and crystallographic seeding microstructure between adjacent layers. During deposition, the initial crystal lattice of the underlayer 16 may tend to align or match with the crystal lattice of the underlying seed layer 12. The microstructure and crystal texture of underlayer 16 somewhat "inherits" the microstructure and crystal texture of seed layer 12. The similarity between lattice parameters of underlayer 16 and seed layer 12 is believed to enhance the effect that seed layer 12 has on underlayer 16. If the underlayer 16 is sufficiently thin, then the microstructure and crystal texture of underlayer 16 is affected throughout the entire thickness of underlayer 16. Thus underlayer 16 acquires a crystallographic structure which is slightly different based on the crystallographic structure of seed layer 12. Seeding with a nickel-aluminum seed layer 12 will produce one crystallographic structure in a chromium underlayer 16, while seeding with a chromium seed layer will produce a different crystallographic structure. Seeding with another material will produce a third crystallographic structure in chromium underlayer 16, while absence of seeding will produce yet another different crystallographic structure.

The growth mode of the crystallographic structure of the magnetic layer 18 is believed to be similarly dependent on the underlying underlayer. Provided the magnetic layer 18 is sufficiently thin, each different crystallographic structure of underlayer 16 will produce a different crystallographic structure of magnetic layer 18. Workers skilled in the art will appreciate that seed layer 12, underlayer 16 and magnetic layer 18 all interrelate toward the crystalline structure and magnetic properties of the magnetic thin film. The selection of materials and deposition parameters for seed layer 12, underlayer 16 and magnetic layer 18 may accordingly be modified as appropriate to arrive at a mix of materials and deposition parameters which produces optimal magnetic properties.

Magnetic media 10 according to the present invention have increased coercivity and decreased media noise. Seeding a chromium underlayer 16 with a nickel-aluminum seed layer 12 in particular produces a beneficial structure for growth of a magnetic layer 18 with excellent magnetic properties.

COMPARISON EXAMPLES

Comparison testing was performed to determine the effectiveness the present invention. Each comparison group tested one disc with a nickel-aluminum seed layer/chromium underlayer combination against a second disc with a chromium seed layer/chromium underlayer. Other than the selection of the material for the seed layer, both discs in each comparison group were identically fabricated.

Four comparison groups tests were run, with differing thicknesses of seed layers and underlayers between the four comparison groups. The thickness of the seed layer 12 and the underlayer 16 were controlled by varying sputter power within the sputter chambers. The various powers used are shown below.

TABLE I

| DEPOSITION PARAMETERS OF COMPARISON TESTING | | | |
| --- | --- | --- | --- |
| Comparison Group No. | Seed layer power (kW) | Underlayer power (kW) | Magnetic layer power (kW) |
| 1 | 1.0 | 2.0 | 1.0 |
| 2 | 1.0 | 1.5 | 1.0 |
| 3 | 0.5 | 2.0 | 1.0 |
| 4 | 1.25 | 1.25 | 1.0 |

Figure 2:
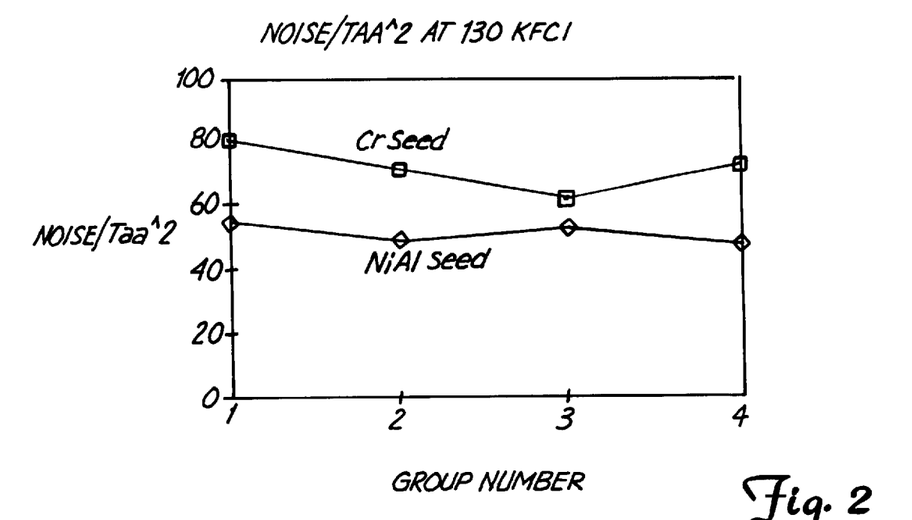
FIG. 2 graphically shows noise values for thin film media constructed according to the sputter powers of TABLE I.
Figure 3:
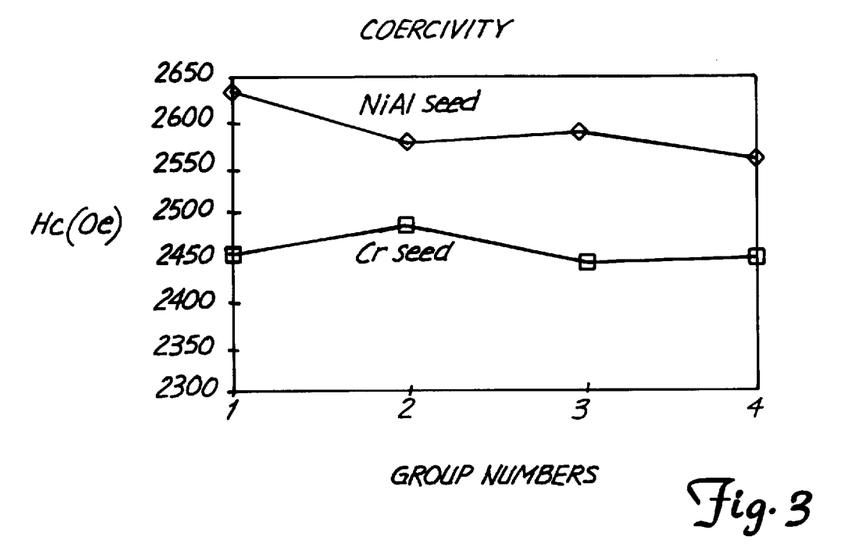
FIG. 3 graphically shows coercivity values for thin film media constructed according to the sputter powers of TABLE I.

Coercivity of the resultant discs 10 was tested on a remanent moment magnetometer. Recording performance of the resultant discs 10 was tested on a Guzik 1601 tester, using an MR head with a gap length of 3.2 Angstroms, at a rotation speed of 3500 rpm and at 1.275 inch radius. Media noise was integrated through the frequency range of 1.17 to 36.2 MHz, normalized against the square of track amplitude average, $(TAA)^2$. FIGS. 2 and 3 show test results for coercivity and media noise for the four sets of comparison runs. To arrive at the media noise values shown in FIG. 3, the tested media noise values were multiplied by a constant correction factor for head gain of $1.15 \times 10^{-5}$.

Each of the four test comparisons showed a noise improvement achieved by the present invention as compared to the similarly prepared chromium seed layer/chromium underlayer disc. Each of the four test comparisons also showed a coercivity improvement achieved by the present invention as compared to the similarly prepared chromium seed layer/chromium underlayer disc. In these four test comparison groups, the noise improvement of the present invention ranged from about 10% to 25%, and the coercivity improvement ranged from about 100 to 200 Oersteds.

The test results shown in FIGS. 2 and 3 indicate that seeding a chromium underlayer 16 with a nickel-aluminum seed layer 12 produces a beneficial structure for growth of a magnetic layer 18 with excellent magnetic properties. Further experimentation may reveal other combinations of deposition parameters and/or materials which may allow the seed layer 12 to have an even greater benefit on the magnetic properties of media 10.

PROCESS PARAMETER OPTIMIZATION EXAMPLES

The preferred values given above for deposition parameters—heater power, NiAl bias, NiAl gas flow, NiAl sputter power, Cr sputter power, and CoCrTa gas flow—are predicted to optimize coercivity and signal-to-noise ratio based on controlled testing of 29 magnetic media. The testing was devised and test results were analyzed with "Design of Experiments" software provided by Launsby Consulting, Colorado Springs, Colo.

For each of the test media 10, a substrate 14 of nickel-phosphorus plated aluminum was cleaned and heated before deposition of the seed layer 12. An Intervac MDP250B sputter system was used to deposit the seed layer 12, the underlayer 16, the magnetic thin film layer 18 and the overcoat 20. The layers 12, 16, 18 and 20 were deposited immediately one after the other in adjacent sputter chambers, with a separate sputter chamber for each type of target. The sputter duration was maintained at a constant 6 seconds for all layers. A magnetic thin film composition of 84% Co, 10% Cr, 6% Ta was used for the magnetic thin film layer 18 on all 29 runs. An identical amorphous carbon overcoat 20 of about 150 Angstroms was used over all the discs.

Six deposition parameters were varied between the 29 test runs: the heater power or sputter temperature, the NiAl bias, the NiAl gas flow or sputter pressure, the NiAl sputter power or thickness, the Cr sputter power or thickness, and the CoCrTa gas flow or sputter pressure. The values for these six parameters were selected to work with the Design of Experiments software. The heater power was varied from 3.2 to 3.5 kilowatts. The NiAl bias was varied from 0 to 250 volts, the NiAl gas flow was varied from 8 to 15 standard cubic centimeters per minute, and the NiAl sputter power was varied from 0.5 to 1.5 kilowatts. The Cr sputter power was varied from 1.25 to 2.5 kilowatts, and the CoCrTa gas flow was varied from 12 to 35 standard cubic centimeters per minute. The values for these six deposition parameters used in fabricating each of the 29 discs are given below in TABLE II.

TABLE II

DEPOSITION PROCESS PARAMETER TEST RUNS

| Run | Heater (kW) | NiAl bias (V) | NiAl flow (sccm) | NiAl power (kW) | Cr power (kW) | CoCrTa flow (sccm) |
|---|---|---|---|---|---|---|
| 1 | 3.3 | 0 | 8 | 1.0 | 2.50 | 24 |
| 2 | 3.5 | 130 | 8 | 0.5 | 2.50 | 35 |
| 3 | 3.2 | 130 | 15 | 1.0 | 1.85 | 35 |
| 4 | 3.2 | 250 | 12 | 1.5 | 2.50 | 24 |
| 5 | 3.5 | 250 | 8 | 1.0 | 1.25 | 35 |
| 6 | 3.3 | 130 | 12 | 1.0 | 1.85 | 24 |
| 7 | 3.3 | 0 | 15 | 1.0 | 2.50 | 12 |
| 8 | 3.5 | 130 | 12 | 0.5 | 2.50 | 12 |
| 9 | 3.3 | 130 | 12 | 1.5 | 1.25 | 35 |
| 10 | 3.5 | 0 | 12 | 1.5 | 1.85 | 12 |
| 11 | 3.5 | 250 | 12 | 1.0 | 1.25 | 12 |
| 12 | 3.2 | 130 | 8 | 1.0 | 1.85 | 12 |
| 13 | 3.3 | 130 | 12 | 1.0 | 1.85 | 24 |
| 14 | 3.3 | 250 | 8 | 0.5 | 1.85 | 24 |
| 15 | 3.2 | 0 | 12 | 0.5 | 1.25 | 24 |
| 16 | 3.2 | 0 | 8 | 0.5 | 1.25 | 12 |
| 17 | 3.3 | 0 | 12 | 1.0 | 2.50 | 35 |
| 18 | 3.5 | 0 | 8 | 1.5 | 1.85 | 35 |
| 19 | 3.5 | 130 | 15 | 0.5 | 2.50 | 24 |
| 20 | 3.5 | 250 | 15 | 1.0 | 1.25 | 24 |
| 21 | 3.2 | 250 | 15 | 1.5 | 2.50 | 35 |
| 22 | 3.3 | 130 | 15 | 1.5 | 1.25 | 12 |
| 23 | 3.3 | 250 | 15 | 0.5 | 1.85 | 12 |
| 24 | 3.2 | 0 | 15 | 0.5 | 1.25 | 35 |
| 25 | 3.2 | 250 | 8 | 1.5 | 2.50 | 12 |
| 26 | 3.3 | 130 | 8 | 1.5 | 1.25 | 24 |
| 27 | 3.2 | 130 | 12 | 1.0 | 1.85 | 24 |
| 28 | 3.3 | 250 | 12 | 0.5 | 1.85 | 35 |
| 29 | 3.5 | 0 | 15 | 1.5 | 1.85 | 24 |

Figure 4:
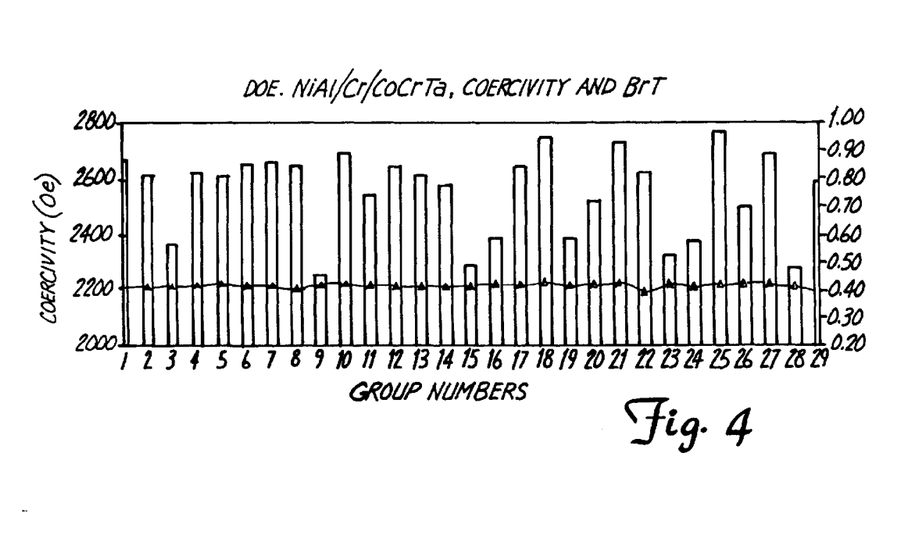
FIG. 4 graphically shows coercivity and $B_r t$ values for 29 thin film media of the present invention constructed at the deposition parameters shown in TABLE II.
Figure 5:
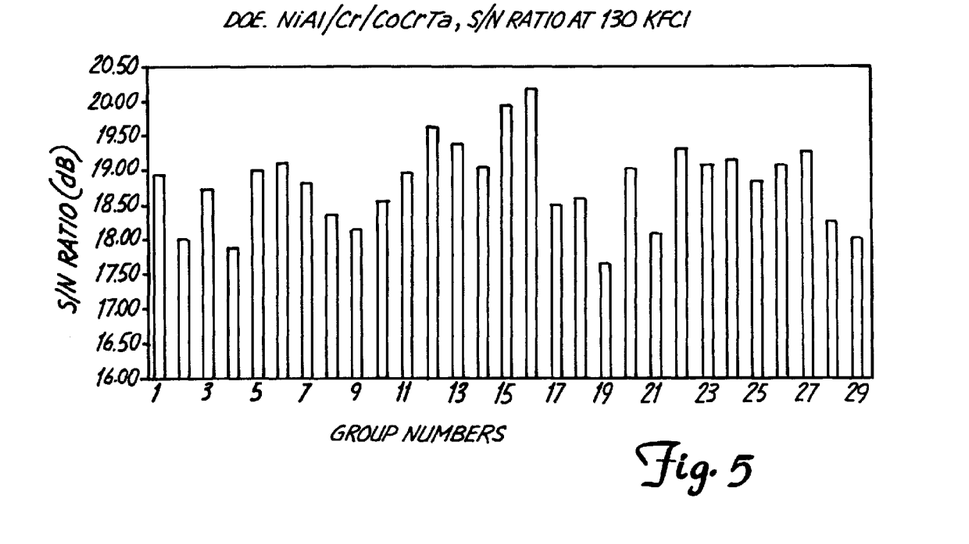
FIG. 5 graphically shows signal-to-noise ratio values for 29 thin film media of the present invention constructed at the deposition parameters shown in TABLE II.
Figure 6:
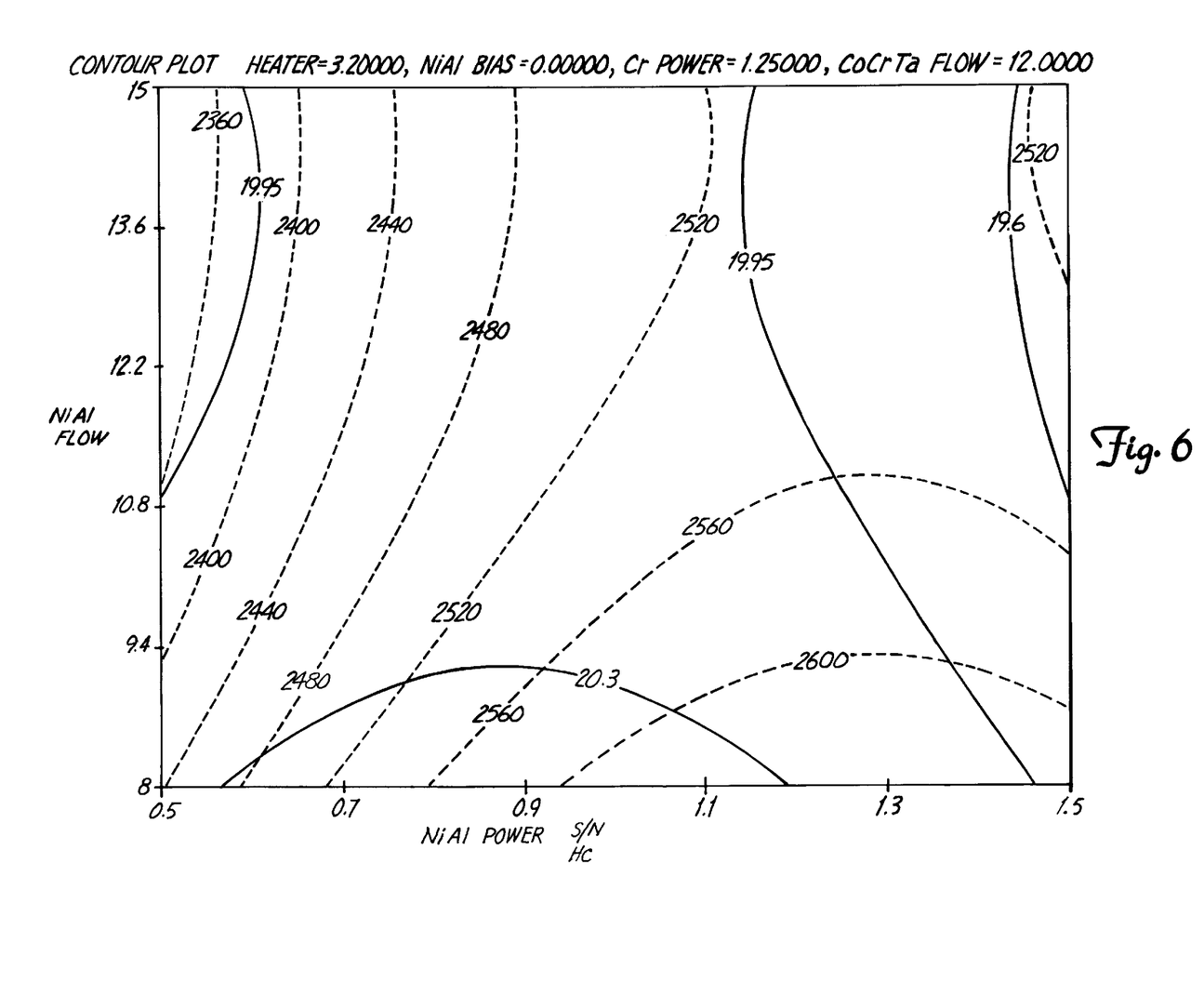
FIG. 6 is a contour plot of predicted coercivity and signal-to-noise ratio as a function of NiAl sputter pressure vs. NiAl sputter power.
Figure 7:
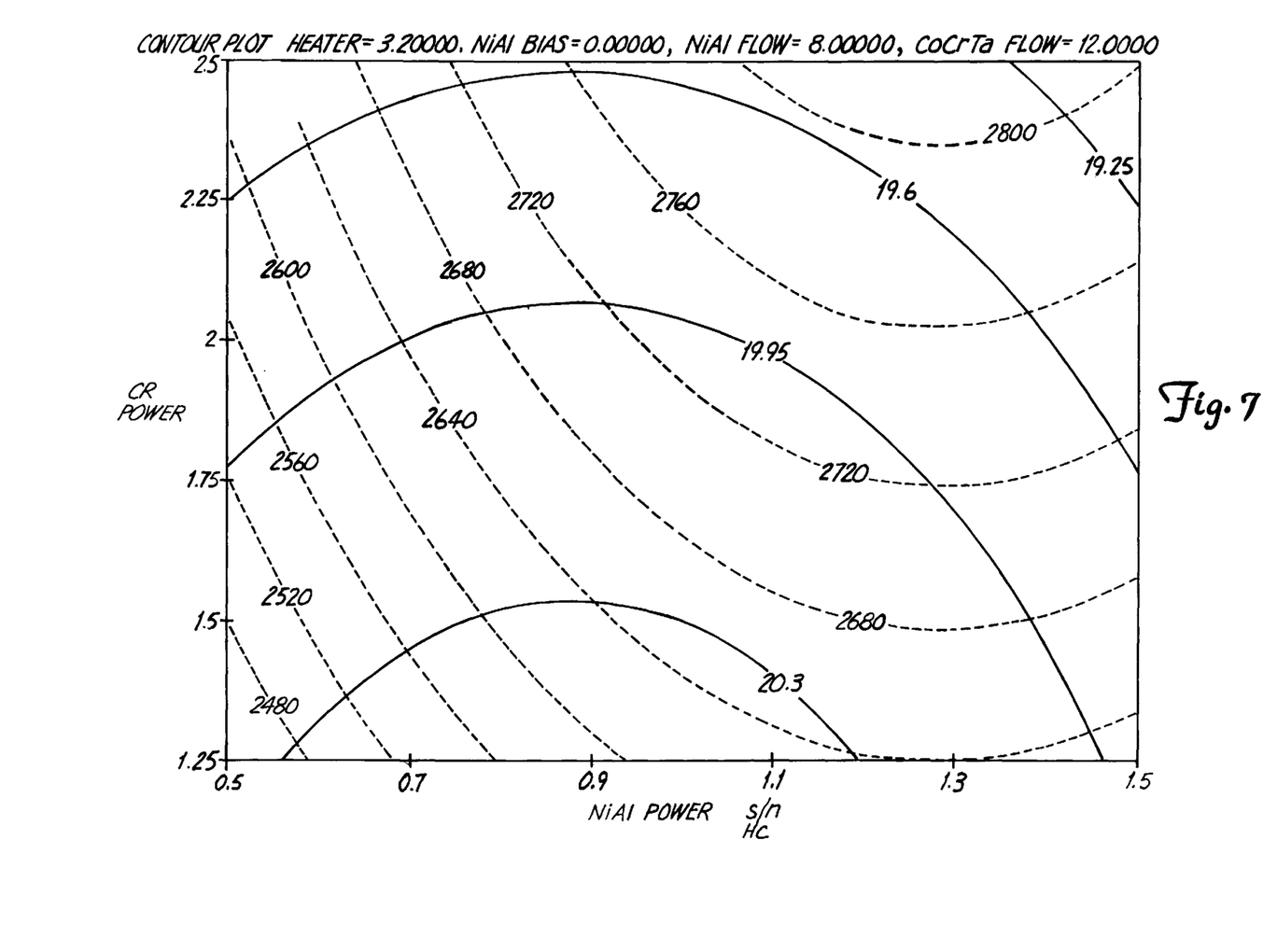
FIG. 7 is a contour plot of predicted coercivity and signal-to-noise ratio as a function of Cr layer sputter power vs. NiAl sputter power.
Figure 8:
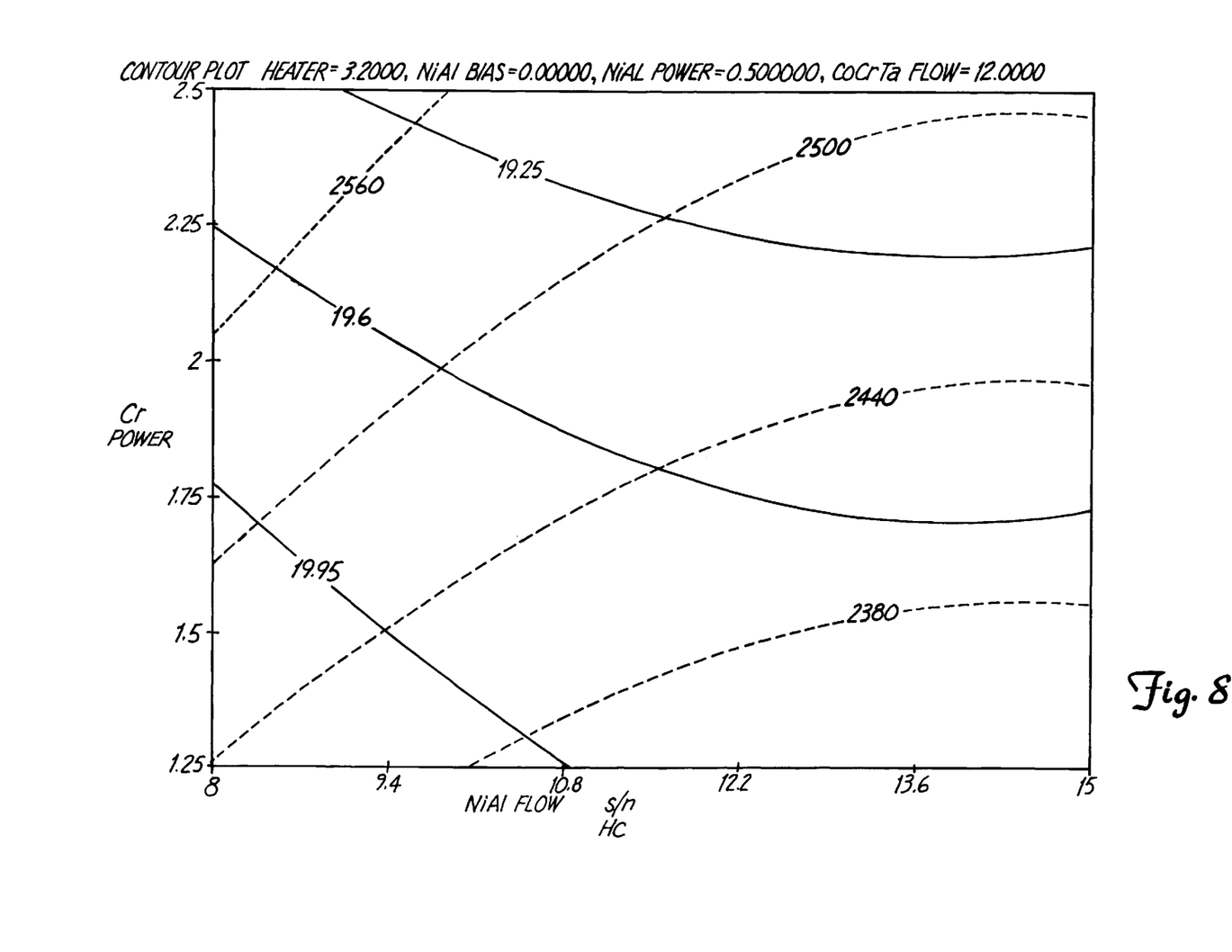
FIG. 8 is a contour plot of predicted coercivity and signal-to-noise ratio as a function of Cr layer sputter power vs. NiAl sputter pressure.
Figure 9:
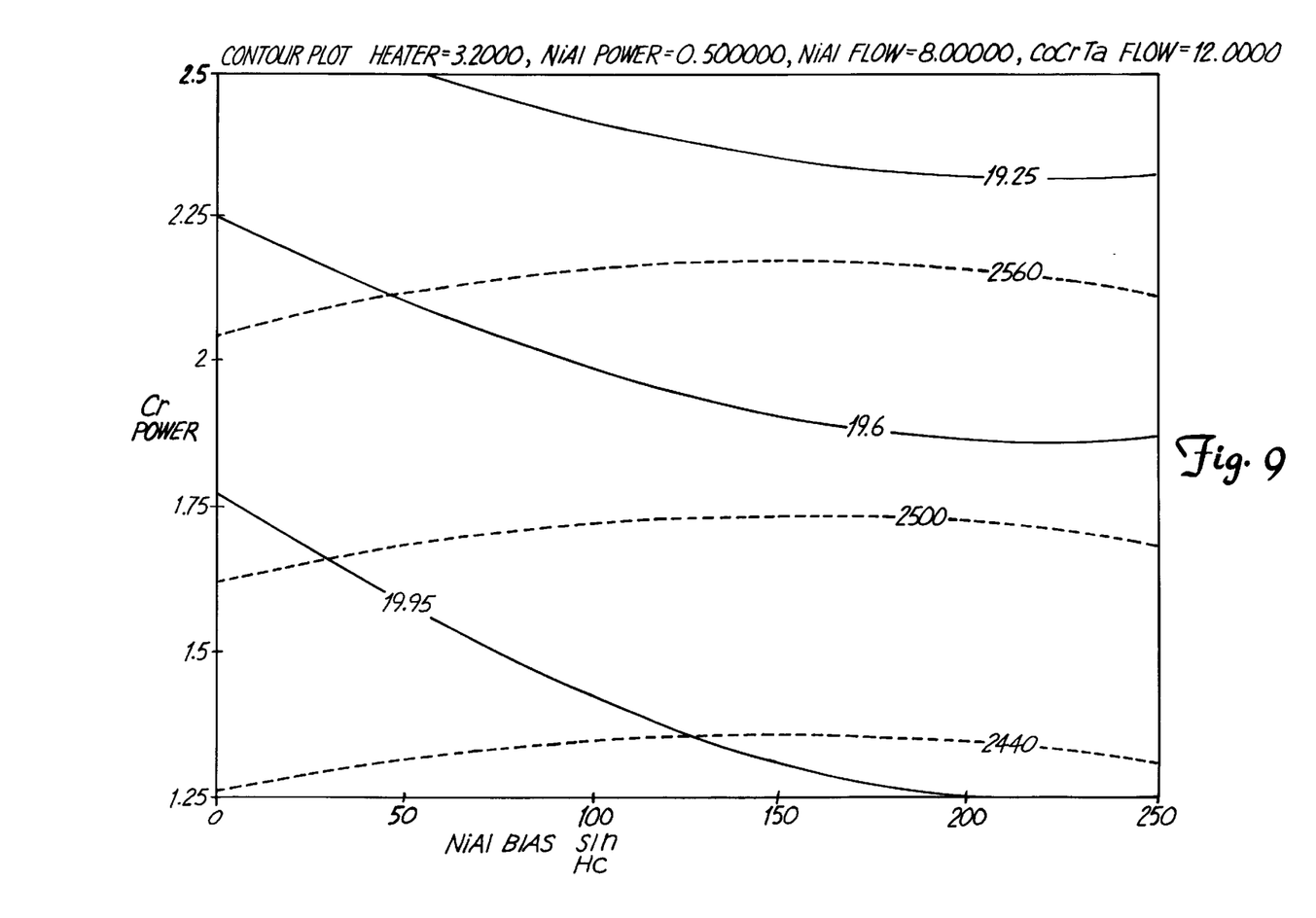
FIG. 9 is a contour plot of predicted coercivity and signal-to-noise ratio as a function of Cr layer sputter power vs. NiAl bias.
Figure 10:
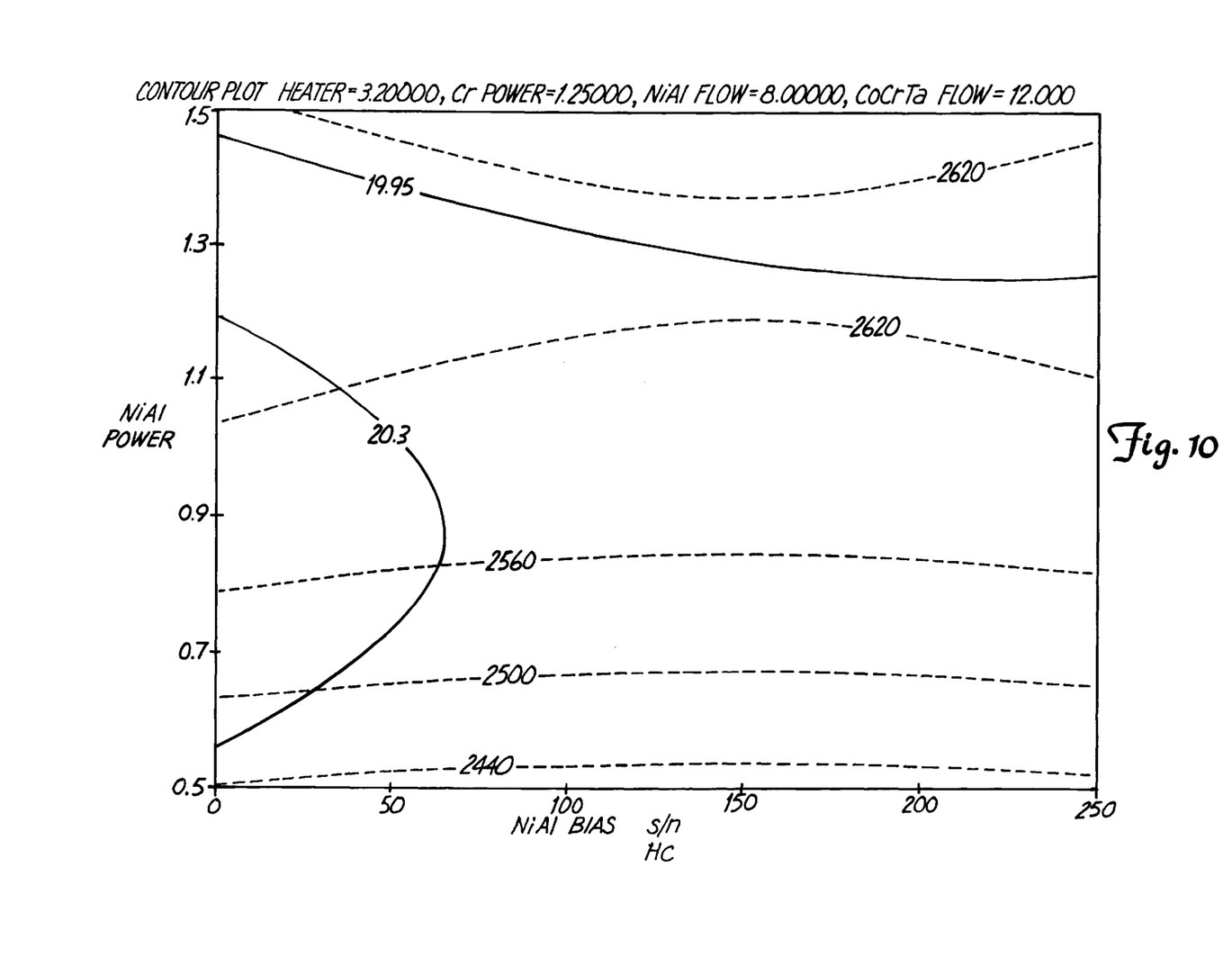
FIG. 10 is a contour plot of predicted coercivity and signal-to-noise ratio as a function of NiAl sputter power vs. NiAl bias.
Figure 11:
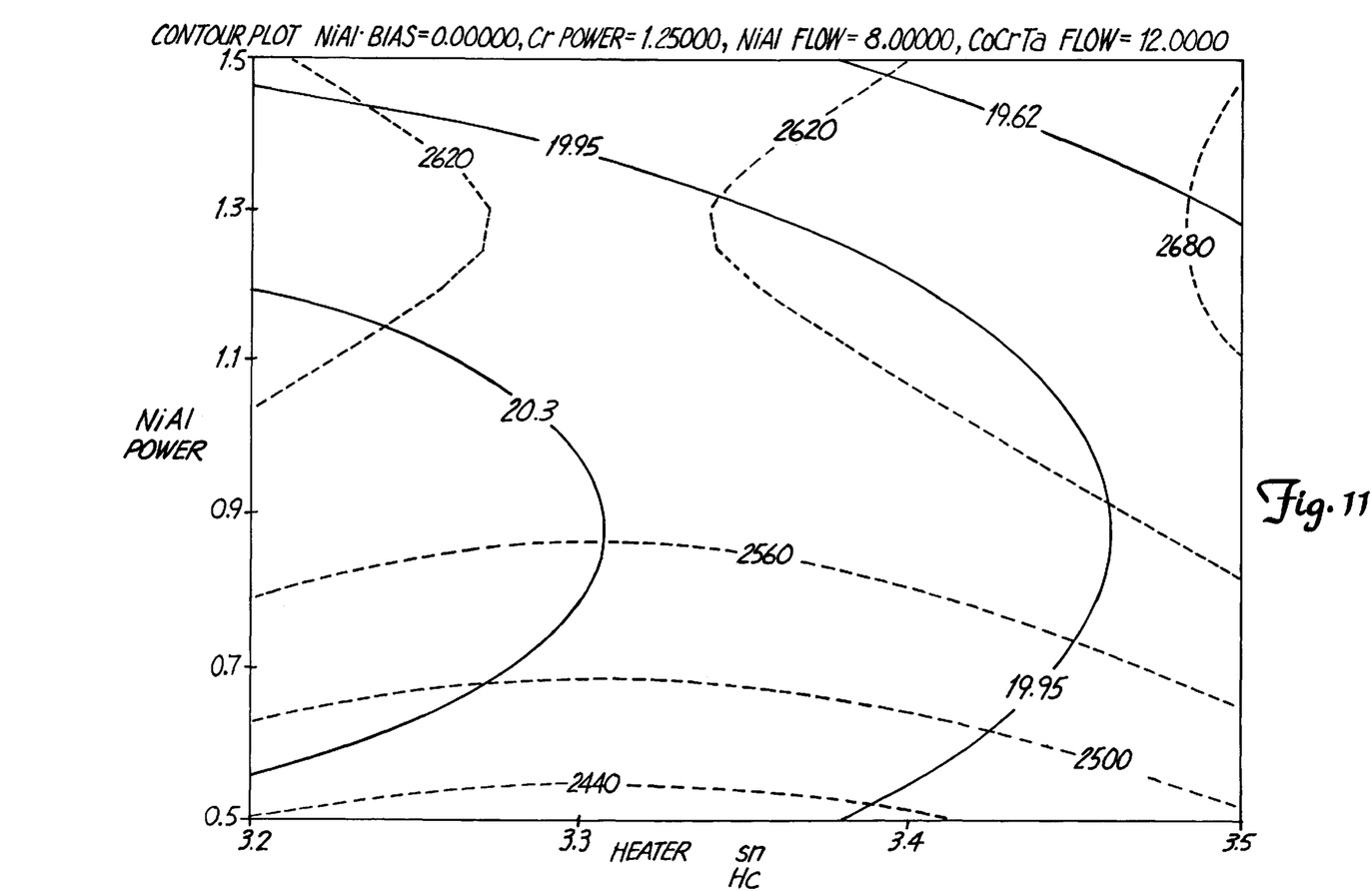
FIG. 11 is a contour plot of predicted coercivity and signal-to-noise ratio as a function of NiAl sputter power vs. heater power.
Figure 12:
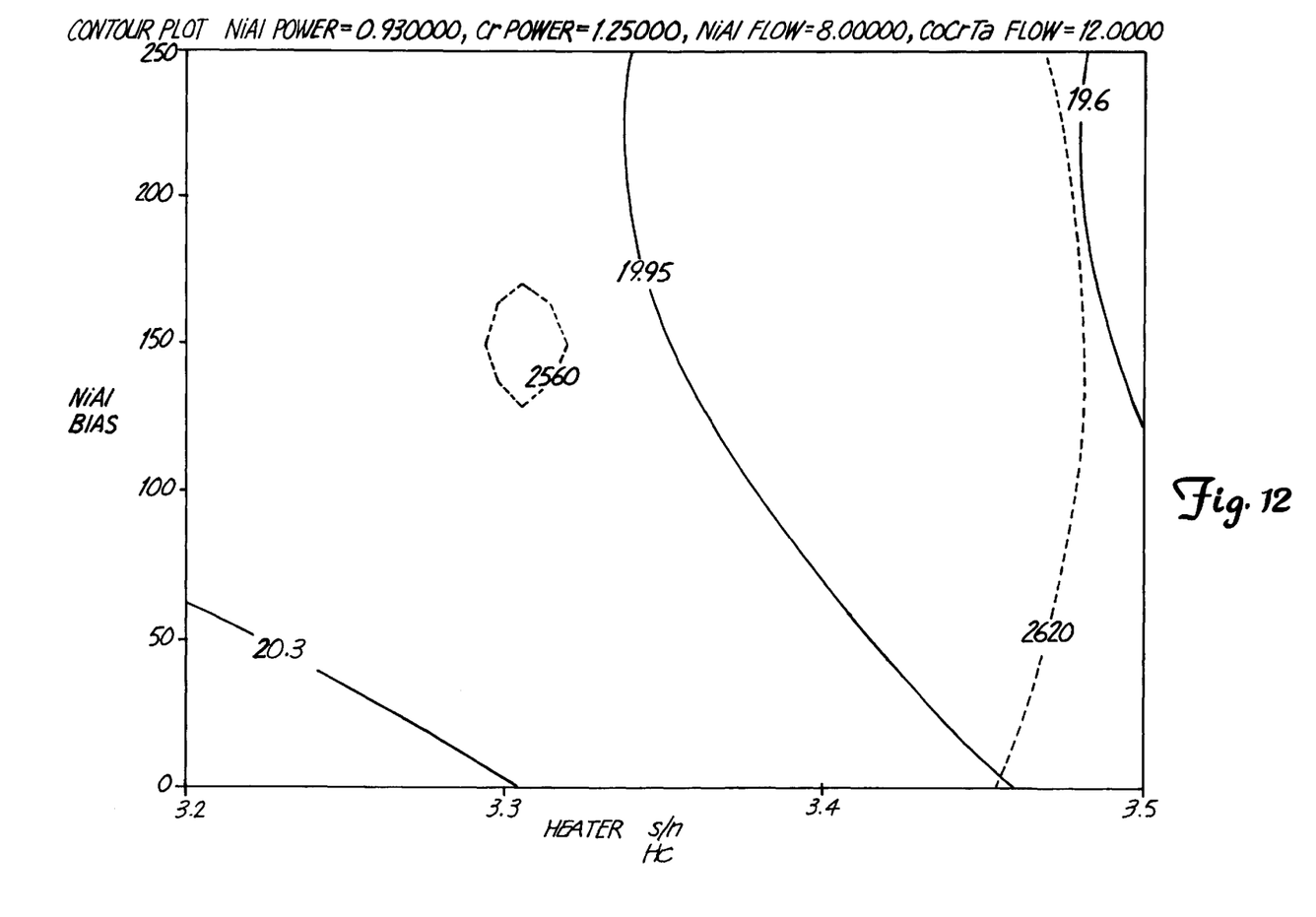
FIG. 12 is a contour plot of predicted coercivity and signal-to-noise ratio as a function of NiAl bias vs. heater power.

Magnetic properties of the 29 resultant discs 10 were tested on a remanent moment magnetometer. Recording performance was tested on a Guzik 1601 tester, using an MR head with a gap length of 3.2 Angstroms, at a rotation speed of 3500 rpm and at 1.275 inch radius. Tested values of coercivity, $B_r t$ and signal-to-noise ratio of the 29 test runs are shown in FIGS. 4 and 5.

Coercivity values of the resultant thin film media 10 ranged from about 2200 to 2800 Oersteds depending upon the process parameters used. The product of remanent magnetic flux density times thickness, $B_r t$, for the 29 test runs varied slightly, averaging about 0.4 microinch-Tesla (100 Angstrom-Tesla). The signal-to-noise ratio for the 29 test runs, tested at 130 kcfi, ranged from about 17.5 decibels to about 20 decibels. As indicated by the ranges of coercivity and media noise found in the 29 test runs of thin film media 10, the beneficial effects of the seed layer 12 can be significantly optimized by proper selection of the deposition parameters.

FIGS. 6–12 are contour plots of predicted coercivity and signal-to-noise ratio values. Each of FIGS. 6–12 are reported as a predicted function of two of the six deposition process parameters which were varied between the 29 test runs, with the remaining four deposition process parameters theoretically held constant at nominal values.

Optimization is theoretically achieved by following the prediction of the contour plots. Based on the tested coercivity and signal-to-noise ratio values for the 29 runs, the optimal process parameters determined by the Design of Experiments software are given in TABLE III.

TABLE III

PREDICTED OPTIMIZED PROCESS PARAMETERS

| | Heater (kW) | NiAl bias (V) | NiAl flow (sccm) | NiAl power (kW) | Cr power (kW) | CoCrTa flow (sccm) |
|---|---|---|---|---|---|---|
| Optimal | 3.2 | 0 | 12 | 0.9 | 2.0 | 30 |

It should be emphasized that these values given are predicted optimal values based on the testing conducted and reported herein. Further testing should be performed to verify the accuracy of these optimization predictions, and to determine if other factors affect the benefit received by using the seed layer of the present invention.

Although the present invention has been described with reference to preferred embodiments, workers skilled in the art will recognize that changes may be made in form and detail without departing from the spirit and scope of the invention. For instance, workers skilled in the art will appreciate that the values for various sputtering parameters discussed herein can be modified as desired to produce beneficial magnetic properties on the resultant thin film media. Workers skilled in the art will recognize that seed layers, underlayers and magnetic layers of other materials may produce beneficial results, provided the three materials of the seed layer, the underlayer and the magnetic layer are chosen for appropriate crystallographic interaction.

What is claimed is:

1. A thin film medium for magnetic recording of information, the thin film medium comprising:
   a substrate;
   a seed layer of nickel-aluminum alloy deposited over the substrate, the seed layer having a seed layer thickness;
   an underlayer of chromium-based metal deposited over the seed layer, the underlayer having an underlayer thickness which is about as thick or thicker than the seed layer thickness; and
   a film of a magnetic material deposited over the underlayer.

2. The thin film medium of claim 1 wherein the seed layer has a molar ratio of from 41.5 to 55% aluminum.

3. The thin film medium of claim 2 wherein the seed layer has a molar ratio of about 50% aluminum.

4. The thin film medium of claim 1 wherein the underlayer is substantially pure chromium.

5. The thin film medium of claim 1 wherein the film of magnetic material is a cobalt-based alloy.

6. The thin film medium of claim 5 wherein the cobalt-based magnetic material is a cobalt-chromium-tantalum alloy.

7. The thin film medium of claim 1, further comprising:
   an overcoat over the film of magnetic material; and
   a lubricant layer over the overcoat.

8. The thin film medium of claim 1 wherein the seed layer has a thickness within the range of 150 to 450 Angstroms.

9. The thin film medium of claim 8 wherein the seed layer has a thickness of about 270 Angstroms.

10. The thin film medium of claim 1 wherein the underlayer has a thickness within the range of 300 to 650 Angstroms.

11. The thin film medium of claim 10 wherein the underlayer has a thickness of about 500 Angstroms.

12. The thin film medium of claim 1 wherein the underlayer is 1.5 to 2.5 times as thick as the seed layer.

13. A method of manufacturing a thin film medium for magnetic recording of information, comprising the acts of:
   depositing a seed layer of nickel-aluminum alloy over a substrate to a seed layer thickness;
   depositing an underlayer of chromium-based metal over the seed layer to an underlayer thickness, the underlayer thickness being about as thick or thicker than the seed layer thickness; and
   depositing a magnetic thin film of cobalt-based alloy over the underlayer.

14. The method of claim 13 wherein the depositing acts are achieved by sputtering.

15. The method of claim 14, wherein the sputtering of the seed layer is performed at a power within the range of about 0.5 to 1.5 kilowatts, a bias within the range of about 0 to 250 volts, and a gas flow within the range of about 8 to 15 standard cubic centimeters per minute.

16. The method of claim 15, wherein the sputtering of the seed layer is performed at a power of about 0.9 kilowatts, a bias of about 0 volts, and a gas flow of about 12 standard cubic centimeters per minute.

17. The method of claim 14, wherein the sputtering of the underlayer is performed at a power within the range of 1.25 to 2.5 kilowatts.

18. The method of claim 17, wherein the sputtering of the underlayer is performed at a power of about 2.0 kilowatts, a bias of about −250 volts, and a gas flow of about 25 standard cubic centimeters per minute.

19. The method of claim 14, wherein the sputtering of the magnetic thin film is performed at a gas flow within the range of 12 to 35 standard cubic centimeters per minute.

20. The method of claim 14, wherein the sputtering of the magnetic thin film is performed at a power of about 0.98 kilowatts, a bias of about −250 volts, and a gas flow of about 30 standard cubic centimeters per minute.

21. The method of claim 13, further comprising the act of heating the substrate before depositing the seed layer.

22. The method of claim 13, further comprising the act of applying an overcoat over the magnetic thin film.

* * * * *